W. W. WINGER.

GEARING.

APPLICATION FILED JAN. 8, 1914.

Reissued Sept. 14, 1915.

13,979.

2 SHEETS—SHEET 1.

Witnesses:

H. L. Farrington

A. B. Russel

Inventor

William W. Winger

By J. Weathers Atty.

W. W. WINGER.

GEARING.

APPLICATION FILED JAN. 8, 1914.

Reissued Sept. 14, 1915.

13,979.

2 SHEETS—SHEET 2.

Witnesses:
R. L. Farrington
A. B. Russell

Inventor
William W. Winger,
By Thomas Ewing - Atty.

UNITED STATES PATENT OFFICE.

WILLIAM W. WINGER, OF WOLCOTT, INDIANA.

GEARING.

13,979. Specification of Reissued Letters Patent. Reissued Sept. 14, 1915.

Original No. 1,070,761, dated August 19, 1913, Serial No. 632,599. Application for reissue filed January 8, 1914. Serial No. 811,092.

*To all whom it may concern:*

Be it known that I, WILLIAM W. WINGER, a citizen of the United States, and a resident of the town of Wolcott, county of White, and State of Indiana, have invented certain new and useful Improvements in Gearing, of which the following is a specification.

My invention relates to improvements in gearing and has for its object the provision of driving mechanism which shall be simple of construction and efficient in operation, and is designed to be used more particularly in connection with laundry apparatus wherein a number of tubs are employed in the different cleansing and rinsing operations, the gearing herein described being so arranged that it may be utilized in both the washer and the wringer used in connection therewith, also to provide means to reverse the direction in which it is desired to have the rollers of the wringer rotate.

A further object of my invention is to provide driving mechanism of the class herein described which is adapted to be connected and disconnected from a clothes wringer adjusted in various positions in proximity to the laundry tubs.

The invention consists in the novel construction and arrangement of parts hereinafter described and claimed.

The invention will be best understood by reference to the accompanying drawings forming a part of this specification, and in which—

Figure 1:
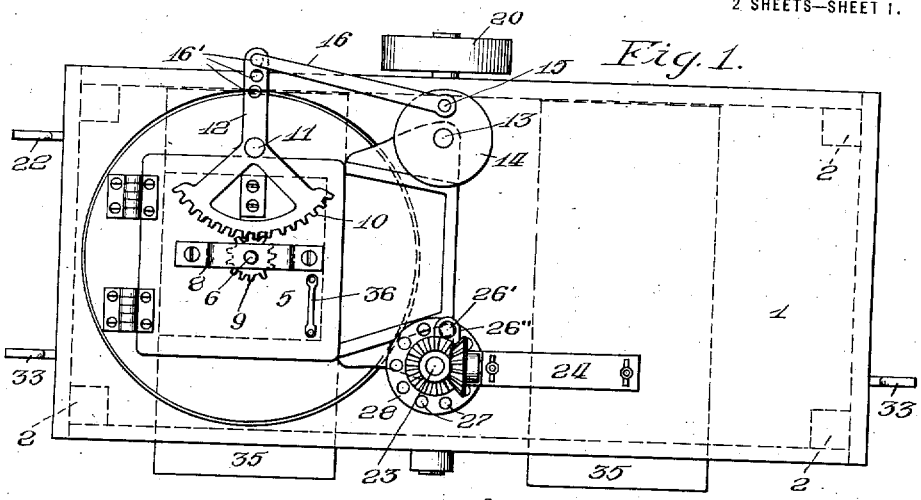
Figure 2:
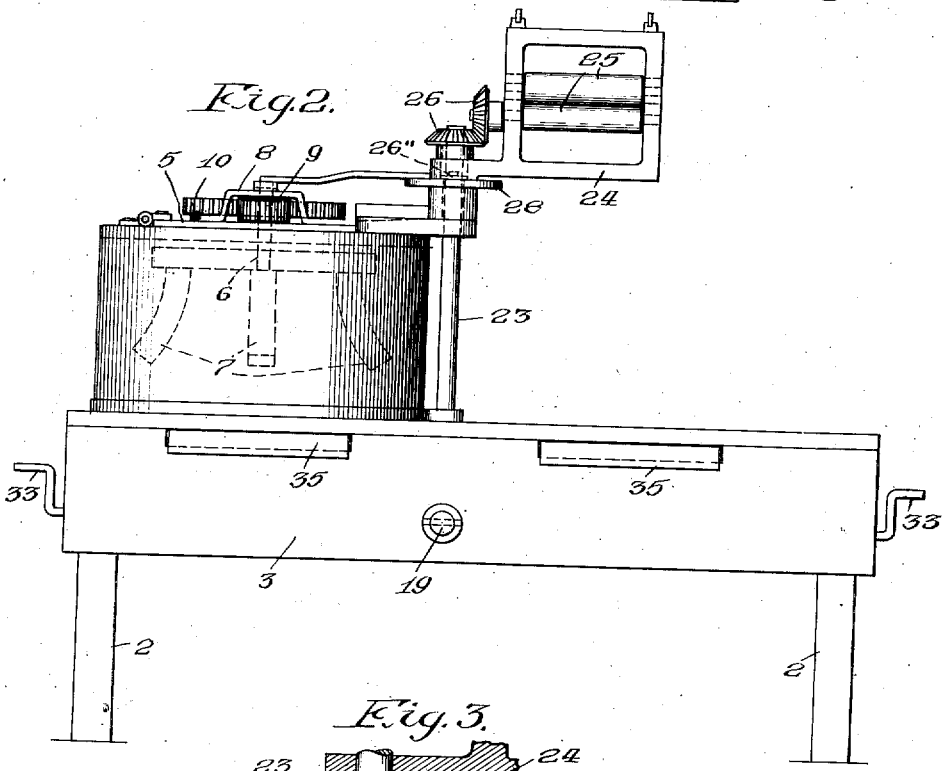
Figure 3:
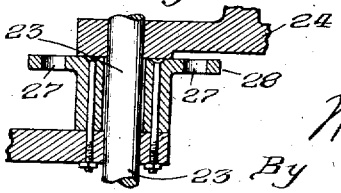
Figure 4:
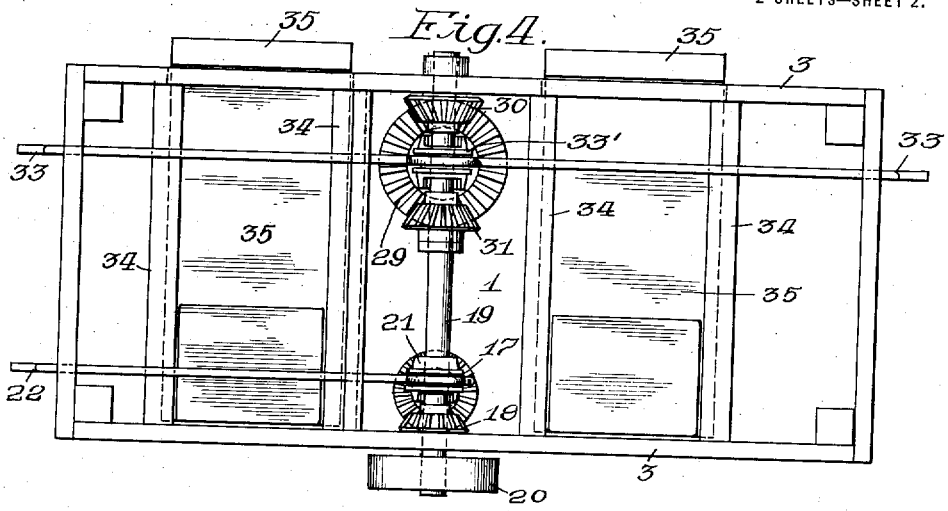
Figure 5:
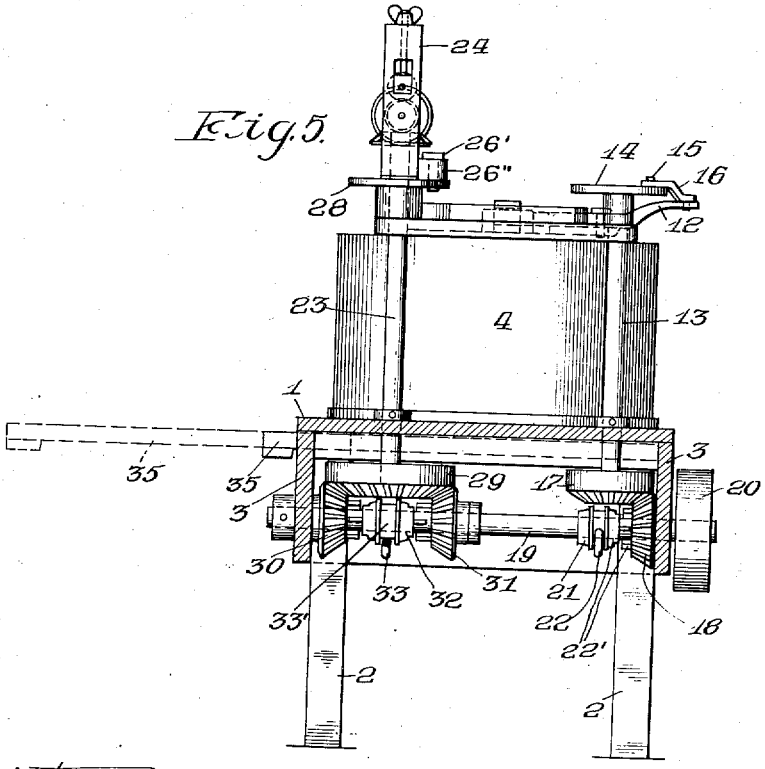

Figure 1 is a top plan view of a washing machine embodying my invention, Fig. 2 is a side elevation thereof, Fig. 3 is a detail vertical section showing a portion of a wringer support employed in the machine, Fig. 4 is a bottom plan view of the machine, and Fig. 5 is an end elevation of the machine showing by dotted lines slidable shelves provided therein in extended position.

The preferred form of construction of my invention as illustrated in the accompanying drawings comprises a table or bench having a top 1, legs 2, and depending side members 3. Mounted upon the table top 1 at one end thereof is a cylindrical clothes receptacle or washer 4 in which the clothes are deposited for washing, access to the interior of said receptacle being effected through a hinged door 5. Rotatably mounted centrally in the washer 4 is an agitator shaft 6 at the lower end of which is provided the revolving agitator 7 as indicated by dotted lines in Fig. 2. The upper end of the shaft 6 is journaled in a bearing strap 8. Carried upon the upper end of the shaft 6 just below the strap 8 is a spur pinion 9 which meshes with and is driven by a segment-gear 10, which in turn is fulcrumed at 11 to one end of the cover 5, the arrangement being such that upon oscillation of the arm 12 formed integral with the gear 10, said agitator 7 will be oscillated to effect the cleansing of the clothes which are brought into contact therewith in the receptacle 4. Mounted in the table or bench 1 adjacent the receptacle 4 is a vertically disposed shaft 13 carrying a circular crank disk 14 at its upper end. A crank pin 15 is operatively connected through the medium of the link 16 with the outer or free end of the arm 12, the arrangement being such that rotation of said crank pin effects oscillation of the gear 10 and consequently the agitator 7. A plurality of perforations 16′ is provided at the outer end of the arm 12 whereby the extent of oscillation of the segment-gear 10 may be varied. Provided at the lower end of the shaft 13 is a crown gear 17 which meshes with a bevel gear 18 loosely mounted on the driving shaft 19, the latter being driven by means of a pulley 20 as will be readily understood by those skilled in the art. Operative connection between the shaft 19 and the gear 18 is effected through the medium of a slidable clutch 21 which is provided with a peripheral groove for engagement with a shifting rod 22, there being intermeshing teeth 22′ provided in the gear 18 and clutch 21 for effecting the locking of these parts upon longitudinal movement of the clutch. Also journaled in the table 1 is a vertically disposed shaft 23 upon the upper end of which is loosely mounted for angular adjustment an ordinary clothes wringer 24, operative connection between the rollers 25 of said wringer being effected through the medium of meshing beveled pinions 26.

The wringer 24 is adapted to be adjusted in a horizontal plane to any angular position, the same being held in any position of adjustment by means of a pin 26′ which passes through a perforated ear 26″ formed integral with the frame or standard of said wringer, said pin being adapted to engage any one of the plurality of perforations 27 provided in a circular index plate 28 which is arranged in a plane below the ear 26′. Provided at the lower end of the shaft 23 is a crown gear 29, operative connection between said crown gear and the driving shaft 19 being effected through beveled pinions 30 and 31 which are loosely mounted upon said shaft 19. Operative connection between the pinions 30 and 31 and said shaft 19 is effected through the medium of a slidable clutch 32 which may be moved into engagement with either of said pinions as desired to effect the connection thereof with said shaft 19, there being a shifting lever or rod 33 which engages with a peripheral groove 33′ provided in the clutch 32 for moving the same longitudinally. The clutches 21 and 32 are splined to the shaft 19 to prevent rotation thereof when in any longitudinal position thereon. With this arrangement it will be seen that the gear 29 may be driven in either direction as desired and the wringer rollers 25 correspondingly driven.

Slidably mounted upon the under side of the table top in guides 34 are leaves 35 which may be drawn out for use in holding a tub of water or a basket of clothes as the case may be.

A handle 36 is provided on the lid 5 of the receptacle 4, whereby the same may be readily lifted for the placing in or removal of clothes from the receptacle.

The mode of operation of this washing machine is as follows: Assuming that the receptacle 4 is filled or partially filled with clothes and suds and that the power shaft 19 is being rotated at a constant speed, then in order to actuate the oscillatory agitator 7 of the washer, the shift lever 22 is moved in the direction necessary for the engagement of the clutch 21 with the bevel gear 18 whereupon the clothes will be agitated and washed in the receptacle 4. After the clothes have been sufficiently cleansed in the washer the shift lever 22 is moved in the opposite direction thus stopping the agitator 7, whereupon the lid 5 may be opened by means of the handle 36 and the clothes moved to a basket provided therefor and supported by one of the leaves 35 adjacent the washer. The wringer 24 may now be swung into a position at right angles with the bench 1 ready to receive the clothes in the wringing process. The shift lever 33 is now moved in such a direction as to effect the engagement of the clutch 32 with either the bevel gear 30 or 31 according to the direction it is desired to have the rollers 25 of the wringer rotate. The clothes in the basket are then fed to the rollers 25, and after being discharged therefrom are received in a basket, not shown, supported by the other shelf 35 thus completing the washing operation.

Any suitable power may be provided for the actuation of the shaft 19, such as a gasolene engine, electric motor, or a suitable steam engine. A washing machine of the construction set forth is compact and symmetrical in design, simple of construction, strong and durable, and capable of performing all of its functions in an efficient and reliable manner.

While I have illustrated and described the preferred form of construction for carrying my invention into effect, this is capable of variation and modification without departing from the spirit of my invention. I therefore, do not wish to be limited to the precise details of construction as set forth, but desire to avail myself of such variations and modifications as come within the scope of the appended claims.

I claim:

1. In a machine of the class described, a supporting frame, a driving shaft, a vertical shaft operated thereby, gearing on said shaft, an operating mechanism supported on said shaft and movable in the arc of a circle around the same, reversing actuating gears mounted on said driving shaft, and means for clutching said gears to the shaft whereby said vertical shaft may be set in motion.

2. In a machine of the class described, a supporting frame, a vertical shaft, an operating mechanism mounted on said vertical shaft and adapted to rotate to different positions relative thereto, means to lock the operating mechanism in different positions on said shaft, a driving shaft, connections including a clutch between the driving shaft and the vertical shaft, and a rod controlling said clutch.

3. In a machine of the class described, a supporting frame, a vertical shaft, an operating mechanism mounted on said shaft and adapted to be swung to different positions relative thereto, said operating mechanism including a shaft extension having a bevel gear thereon, means to lock said operating mechanism in different positions around said vertical shaft, a driving shaft geared to the vertical shaft, clutch mechanism controlling the direction of rotation of said vertical shaft, and a rod controlling said clutch mechanism.

4. In a machine of the class described, a supporting frame, a vertical shaft, operating mechanism mounted on said shaft and adapted to be rotated to different positions relative thereto, means to lock said operating mechanism in different positions radially of said shaft, a drive shaft, gearing between the drive shaft and the vertical shaft, said gearing including a shiftable element for transmitting motion in either direction to said vertical shaft, and a rod controlling said shiftable element, said rod extending longitudinally of the supporting frame.

5. In a machine of the class described, a supporting frame, a horizontal driving shaft, a vertical shaft driven by the driving shaft, a frame member extending radially from the upper end of said vertical shaft and movable in the arc of a circle about said shaft, means on said operating mechanism adapted to receive power from the vertical shaft, clutch controlled driving connections controlling the operation of said vertical shaft and means for controlling said clutch.

6. In a machine of the class described, a supporting frame, a horizontal driving shaft, a vertical shaft driven thereby, an operating mechanism extending radially from the upper end of said vertical shaft and movable in the arc of a circle about said shaft, means on said operating mechanism adapted to receive power from the vertical shaft, means to lock said operating mechanism in different positions, clutch controlled driving connections controlling the operation of said shaft, a rod extending longitudinally of said frame and controlling the clutch, said rod arranged to be operated from the end of the frame.

7. In a machine of the class described, a supporting frame, a horizontal driving shaft, a vertical shaft driven thereby, an operating mechanism extending radially from the upper end of the vertical shaft, said shaft being the pivotal point about which said operating mechanism rotates, means for locking said operating mechanism in different positions about said shaft, gearing between said operating mechanism and said vertical shaft, and a clutch controlling the transmission of power between said shafts, and means for controlling said clutch.

8. In a machine of the class described, a supporting frame, a horizontal driving shaft, a vertical shaft, means for operating the vertical shaft from the horizontal shaft, a horizontally disposed operating mechanism, a bearing on the vertical shaft for said operating mechanism to adapt said mechanism to be moved in the arc of a circle around said vertical shaft, means for locking the operating mechanism in different adjusted positions, and gearing connecting with said mechanism for transmitting motion thereto from the vertical shaft.

9. In a machine of the class described, a supporting frame, a vertical shaft, a driving shaft, oppositely disposed gears loosely mounted on said driving shaft, an operating mechanism supported from the aforesaid vertical shaft, clutch connections between the vertical and the driving shafts through the aforesaid gears, and means for operating said clutch connections to drive the vertical shaft in either direction.

10. In a machine of the class described, a supporting frame, a horizontal driving shaft journaled in said frame and adapted to be driven from a suitable source of power, a vertical shaft, an operating mechanism supported from the upper end of the vertical shaft and movable about the axis of said shaft, gearing at the upper end of the vertical shaft for driving said operating mechanism, gearing including a clutch connecting the aforesaid shafts and adapted to reverse the movement of the vertical shaft, and a rod controlling the operation of the clutch.

11. In a machine of the class described, a supporting frame, a horizontal driving shaft, a mechanism support extending vertically through said frame and adapted to be driven from the driving shaft, an operative mechanism supported thereon and adapted to rotate about said vertical support, gearing connections between said mechanism and the vertical support, clutch devices coacting with said gearing connections for reversing the operation of said vertical support and means for locking the operating mechanism in adjusted positions about said vertical support.

12. In a machine of the class described, a supporting frame, a driving shaft journaled in said frame and adapted to be driven from a suitable source of power, a vertical shaft, an operating mechanism disposed at right angles to said vertical shaft, a supporting bearing between said mechanism and the vertical shaft to adapt said mechanism to be moved about said vertical shaft and locked in adjusted positions, clutch controlled gearing between the vertical shaft and the driving shaft and a rod connected with said clutch mechanism for reversing the direction of movement of said vertical shaft and the operating mechanism.

13. In a machine of the class described, a driving mechanism comprising a horizontal shaft, a bevel gear loosely mounted on said shaft, a clutch splined to said shaft and adapted to clutch said bevel gear, a vertical shaft and at its lower end a bevel gear in mesh with said first mentioned bevel gear, a crank pin on the upper end of said vertical shaft, a lever arm, a segmental gear on said lever arm, a pinion meshing with said segmental gear and a link connection between said lever arm and said crank pin.

14. In a machine of the class described, a driving mechanism comprising a horizontal shaft, a bevel gear loosely mounted on said shaft, a clutch splined to said shaft and adapted to clutch said bevel gear, a vertical shaft and at its lower end a bevel gear in mesh with said first mentioned bevel gear, a crank pin on the upper end of said vertical shaft, a lever arm, a segmental gear on said lever arm, a pinion meshing with said segmental gear, and an adjustable link connection between said lever arm and said crank pin.

15. The combination of a pivotally supported mechanism adapted to be moved in the arc of a circle, driving gearing adapted for operating the mechanism including a part for imparting opposite directions of rotation to the mechanism elements, part of said gearing being mounted on said member to move therewith, and manually operated means for controlling said gearing.

16. In a machine of the class described, a main frame, a vertical shaft, an operating mechanism having a frame pivotally mounted on said vertical shaft and adapted to be moved to different angular positions relative to the main frame, a power driven element and connections between said power driven element and said operating mechanism to operate the same in its different positions relative to said vertical shaft, said connections including reversing means for actuating the vertical shaft in either direction as desired.

17. In a machine of the class described, a main frame, a vertical shaft, an operating mechanism pivotally mounted on said shaft and adapted to be moved to different angular positions relative thereto, actuating means including a power driven element, said power driven element adapted to be thrown into and out of operative relation with parts of said actuating means for driving said operating mechanism in either direction.

18. In a machine of the class described, a supporting frame, a horizontal driving shaft adapted to be driven from a suitable source of power, a vertical shaft, gearing between said driving shaft and the vertical shaft, an operating mechanism rotatable about said vertical shaft at the upper end thereof, means for locking said mechanism in different operative positions, gears including a clutch mechanism connecting the vertical shaft and the operating mechanism, and a rod connected with said clutch mechanism for reversing the direction of movement of the vertical shaft.

In testimony whereof I have signed this specification in the presence of two subscribing witnesses.

WILLIAM W. WINGER.

Witnesses:

EDWARD BLUME,

ERNEST N. RAWLINGS.